US009800037B2

(12) United States Patent
Nichols et al.

(10) Patent No.: US 9,800,037 B2
(45) Date of Patent: Oct. 24, 2017

(54) POWER/DATA ACCESS MODULE

(71) Applicant: Ditto Sales, Inc./Versteel, Jasper, IN (US)

(72) Inventors: Jerald W. Nichols, Jasper, IN (US); Aaron C. Owens, Jasper, IN (US)

(73) Assignee: Ditto Sales Inc./Versteel, Jasper, IN (US)

( * ) Notice: Subject to any disclaimer, the term of this patent is extended or adjusted under 35 U.S.C. 154(b) by 0 days.

(21) Appl. No.: 15/057,189

(22) Filed: Mar. 1, 2016

(65) Prior Publication Data
US 2016/0255951 A1  Sep. 8, 2016

Related U.S. Application Data

(60) Provisional application No. 62/128,119, filed on Mar. 4, 2015.

(51) Int. Cl.
*A47B 21/06* (2006.01)
*H02G 3/18* (2006.01)

(52) U.S. Cl.
CPC .............. *H02G 3/185* (2013.01); *A47B 21/06* (2013.01); *A47B 2200/0082* (2013.01)

(58) Field of Classification Search
CPC .............. A47B 21/06; A47B 2021/066; A47B 2200/0082; H02G 3/185
See application file for complete search history.

(56) References Cited

U.S. PATENT DOCUMENTS

| | | | | |
|---|---|---|---|---|
| 4,372,629 A * | 2/1983 | Propst | ..................... | A47B 21/06 248/52 |
| 4,656,798 A * | 4/1987 | Hazen | ................... | E04F 15/024 174/488 |
| 5,980,279 A * | 11/1999 | Muller | .................... | A47B 21/06 174/489 |
| 6,162,071 A * | 12/2000 | Muller | ................... | A47B 21/06 174/502 |
| 6,338,301 B1 * | 1/2002 | Almond | ................. | A47B 21/06 108/26 |
| 6,732,661 B2 * | 5/2004 | Grasse | ................... | A47B 21/06 108/50.02 |
| 7,966,951 B1 * | 6/2011 | Black | ..................... | H02G 3/128 108/50.01 |
| 8,082,856 B1 * | 12/2011 | Hayden | .................. | A47B 21/06 108/25 |
| 8,317,537 B1 * | 11/2012 | Black | ..................... | A47B 21/06 439/142 |
| 2004/0075373 A1 * | 4/2004 | Gershfeld | .......... | A47B 21/0073 312/223.3 |
| 2005/0167138 A1 * | 8/2005 | McCarthy | .............. | A47B 21/06 174/53 |
| 2007/0284063 A1 * | 12/2007 | Elwood | .................. | A47B 21/06 160/218 |

(Continued)

*Primary Examiner* — Justin Rephann
(74) *Attorney, Agent, or Firm* — Maginot, Moore & Beck, LLP

(57) ABSTRACT

An access module for providing access to an opening in a table, includes a grommet mounted to the table within the opening and including a top flange spaced apart from a work surface of the table, such that a flange space of the opening is defined from the work surface of the table to the top flange of the grommet; and a bezel mounted to the grommet and including a flange that is only located in the flange space.

9 Claims, 7 Drawing Sheets

(56) References Cited

U.S. PATENT DOCUMENTS

| | | | | |
|---|---|---|---|---|
| 2013/0061783 | A1* | 3/2013 | Bennie | A47B 21/06 108/25 |
| 2013/0334219 | A1* | 12/2013 | Nagaishi | A47B 21/06 220/3.2 |
| 2016/0022030 | A1* | 1/2016 | Scott | A47B 21/06 108/25 |

* cited by examiner

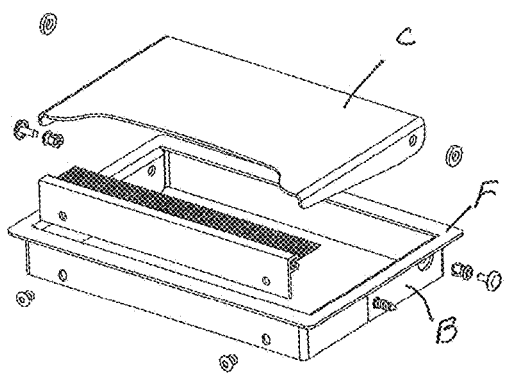
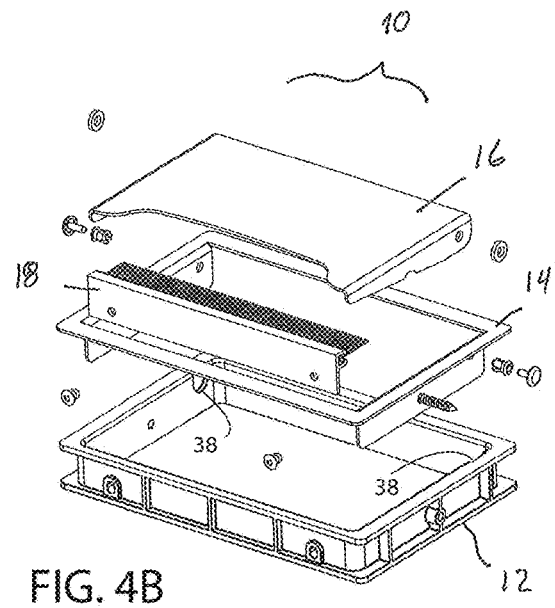
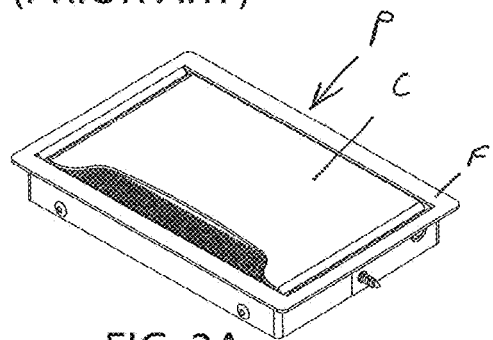
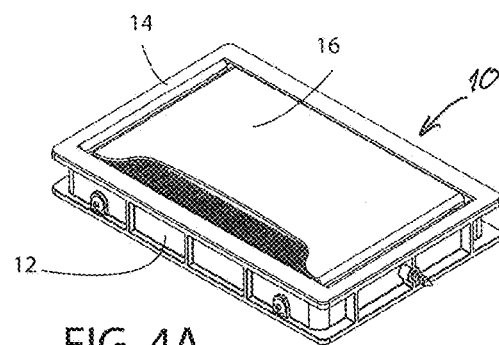
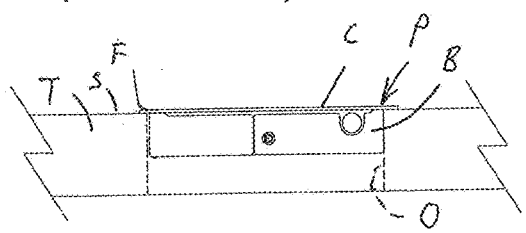
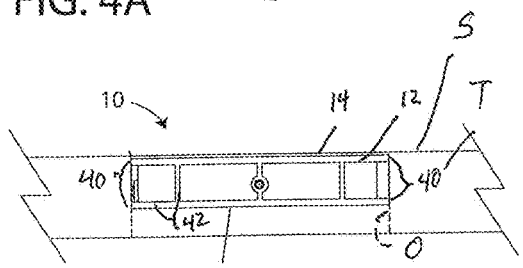
FIG. 3B (PRIOR ART)
FIG. 4B
FIG. 3A (PRIOR ART)
FIG. 4A
FIG. 3C (PRIOR ART)
FIG. 4C

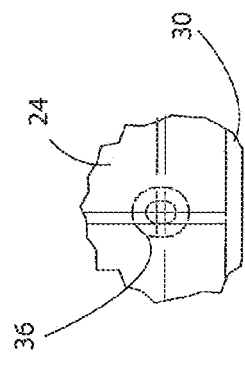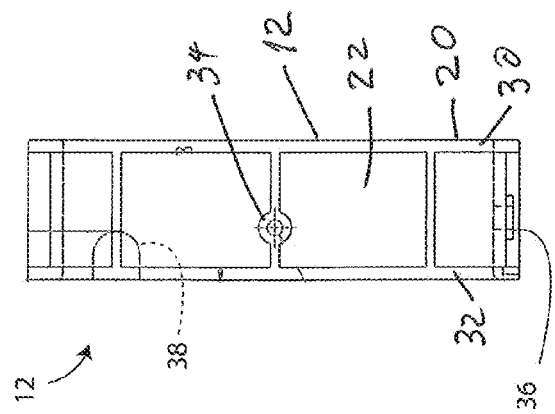
FIG. 7D
FIG. 7C
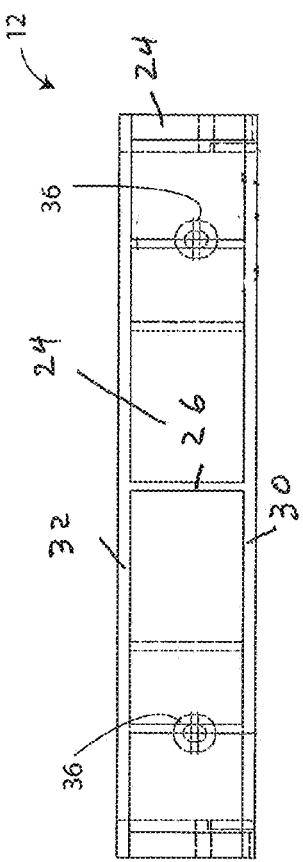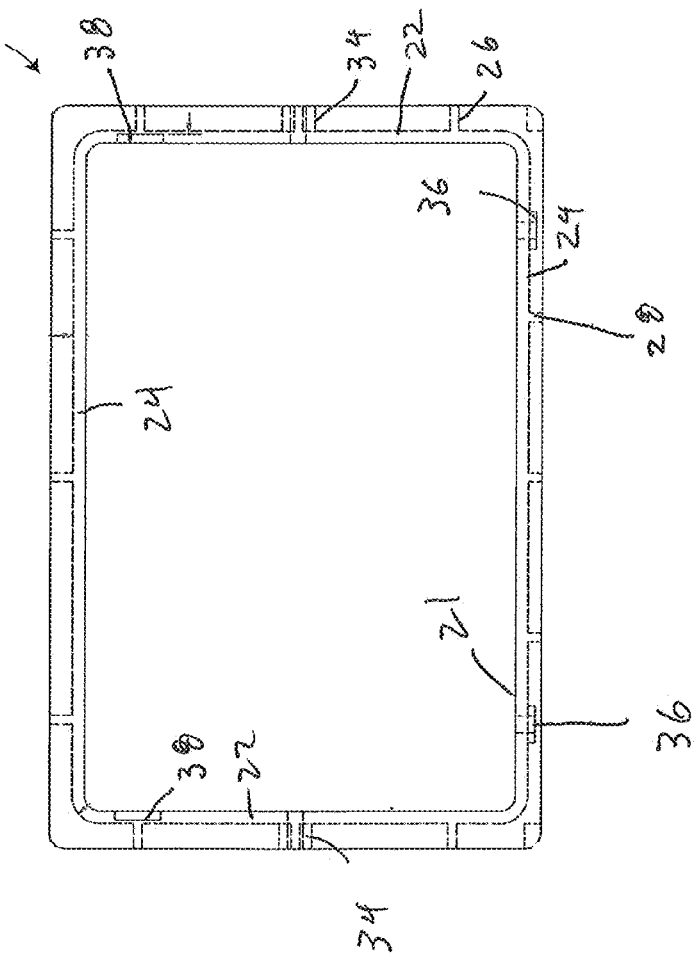
FIG. 7B
FIG. 7A

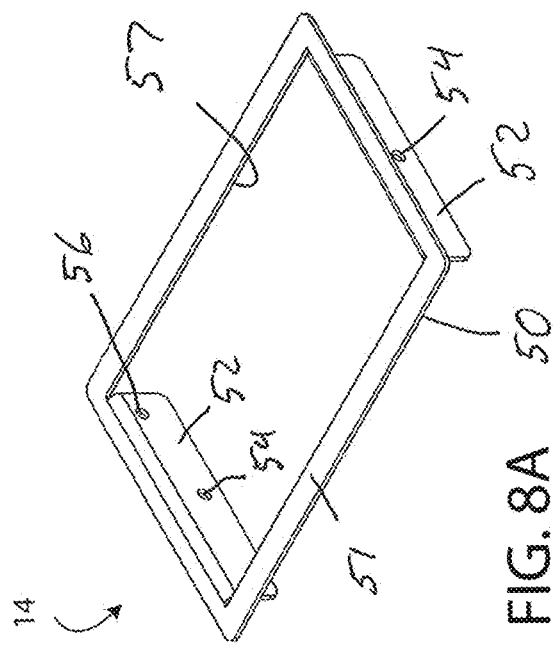
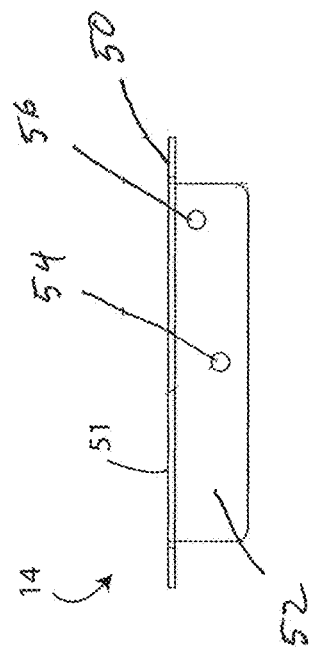
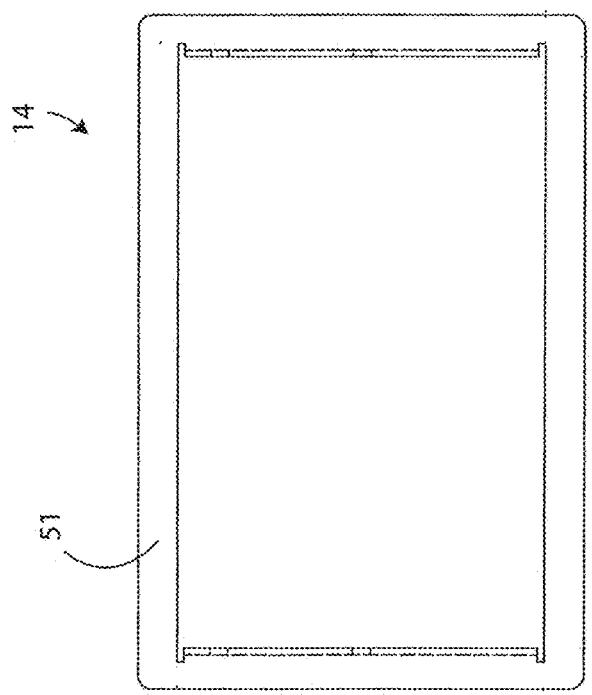

POWER/DATA ACCESS MODULE

This application claims the benefit of priority of U.S. provisional application Ser. No. 62/128,119, filed on Mar. 4, 2015 the disclosure of which is herein incorporated by reference in its entirety.

BACKGROUND

The present disclosure relates to power and data features for furniture, such as conference tables and work stations. In particular, the disclosure concerns a module to be inserted into an opening in a work surface that provides access to power and data receptacles supported beneath the work surface.

In this increasingly data-driven age people rely on their laptop, cell phone, and tablet at a conference or in their workplace. These electronic and computer devices require access to power and data lines. Whereas in the past a work surface was littered with power strips, electrical cords, and data cables, access modules have been provided that are mounted in the work surface so that these components can be hidden beneath the work surface, thereby ridding the work surface of a significant nuisance.

A typical power/data access module P is shown in FIGS. 1A-3C. The module P includes a bezel B that is mounted within a correspondingly shaped opening O (FIG. 3C) in the work surface S (FIG. 3C). The bezel B includes a frame or flange F (FIGS. 3A, 3B, 3C) that sits on the surface S of the table or work station to support the module P and a cover C. The module P provides access to a receptacle R (FIGS. 1B and 2) that is either associated with the bezel B or mounted to the underside of the work surface S.

As particularly shown in FIG. 3C, the power/data access module P is mounted on the work surface S, such that a portion of the module P extends above the work surface S. Specifically, at least the flange of the bezel B extends above the work surface S. Therefore, at least the bevel B creates a discontinuity in the work surface S, particularly when no wires or cables extend through the module P and the cover C is in the closed position of FIGS. 3A and 3C. The discontinuity is disruptive to the person using the work surface S, because it provides an uneven surface for items stacked on the surface S or a feature that can catch papers and objects being pushed across the work surface S.

There is a need for a power/data access module that avoids these problems of the prior modules.

SUMMARY

According to an exemplary embodiment of the disclosure, an access module for providing access to an opening in a table, includes a grommet mounted to the table within the opening and including a top flange spaced apart from a work surface of the table, such that a flange space of the opening is defined from the work surface of the table to the top flange of the grommet; and a bezel mounted to the grommet and including a flange that is only located in the flange space.

According to another exemplary embodiment of the disclosure, an access module for providing access to an opening in a table includes a grommet mounted to the table within the opening, a bezel supported by the grommet and including a flange that is flush with a work surface of the table, and a cover pivotably mounted to the bezel. No portion of the access module is located on a side of the work surface opposite the opening when the cover is in a closed position.

According to yet another exemplary embodiment of the disclosure, a method of mounting an access module including a bezel and a grommet in an opening extending through a table, includes positioning a work surface of the table against a flat support surface, mounting the bezel to the grommet, positioning the bezel and the grommet in the opening with a flange of the bezel positioned against the flat support surface, such that the flange is coincident with the work surface of the table, and mounting the grommet and the bezel to the table to fix the position of the grommet and the bezel relative to the work surface of the table.

BRIEF DESCRIPTION OF THE FIGURES

FIG. 3A is a perspective view of the prior art module of FIG. 1A shown spaced apart from the table and with the cover in the closed position.

FIG. 3B is an exploded perspective view of the prior art module of FIG. 1A shown spaced apart from the table.

FIG. 3C is a side elevational view of the prior module of FIG. 1A shown mounted within the opening in the table.

FIG. 4A is a perspective view of a power/data access module according to the present disclosure shown with a cover of the module in a closed position.

FIG. 4B is an exploded perspective view of the module of FIG. 4A showing a bezel and a grommet of the module.

FIG. 4C is a side elevational view of the module of FIG. 4A with the module mounted in the opening of a table and with the cover in the closed position.

FIG. 7A is top plan view of the grommet of the module of FIG. 5.

FIG. 7B is a front elevational view of the grommet of the module of FIG. 5.

FIG. 7C is a side elevational view of the grommet of the module of FIG. 5.

FIG. 7D is an elevational view of a portion of the grommet of the module of FIG. 5.

FIG. 8A is a perspective view of the bezel of the module of FIG. 5.

FIG. 8B is a top plan view of the bezel of the module of FIG. 5.

FIG. 8C is a front elevational view of the bezel of the module of FIG. 5.

FIG. 8D is a side elevational view of the bezel of the module of FIG. 5.

DETAILED DESCRIPTION

Figure 1A:
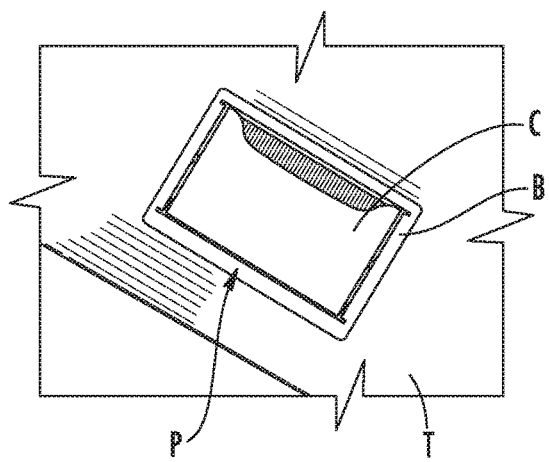
FIG. 1A is a perspective view of a prior art power/data access module positioned in an opening of a table, a cover of the module is shown in a closed position.
Figure 1B:
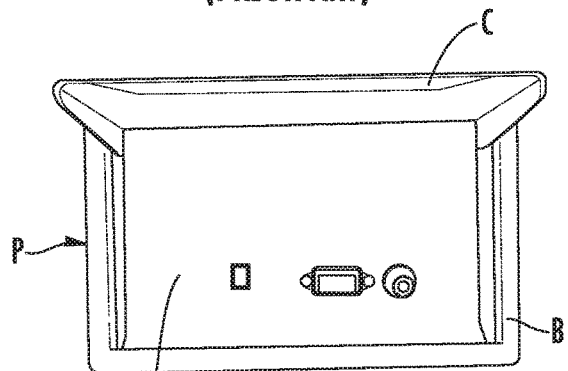
FIG. 1B is a perspective view of the prior art module of FIG. 1A, with the cover shown in an open position to expose power and data receptacles.
Figure 2:
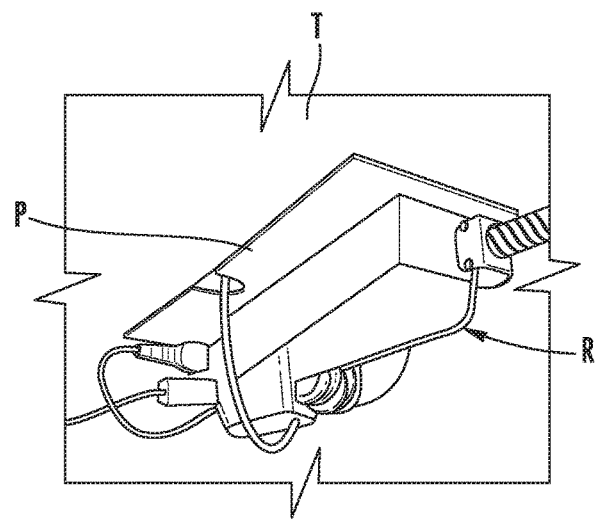
FIG. 2 is a perspective view of an underside of the prior art module and the table of FIG. 1A as well as a receptacle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Referring again to FIG. 3C, the power/data access module P of the prior art includes a bezel B that rests on the work surface S of the table T. In particular, a flange F of the bezel B is positioned above the surface S to support the bezel B extending through the opening O in the table T. Looking now at FIG. 4C, the present disclosure contemplates a power/data access module 10 that sits flush with the surface S of the table T. The module 10 thus presents a smooth, generally uninterrupted surface that is contiguous with the work surface, thereby eliminating the bothersome discontinuities on the work surface S caused by the prior art modules.

Figure 6A:
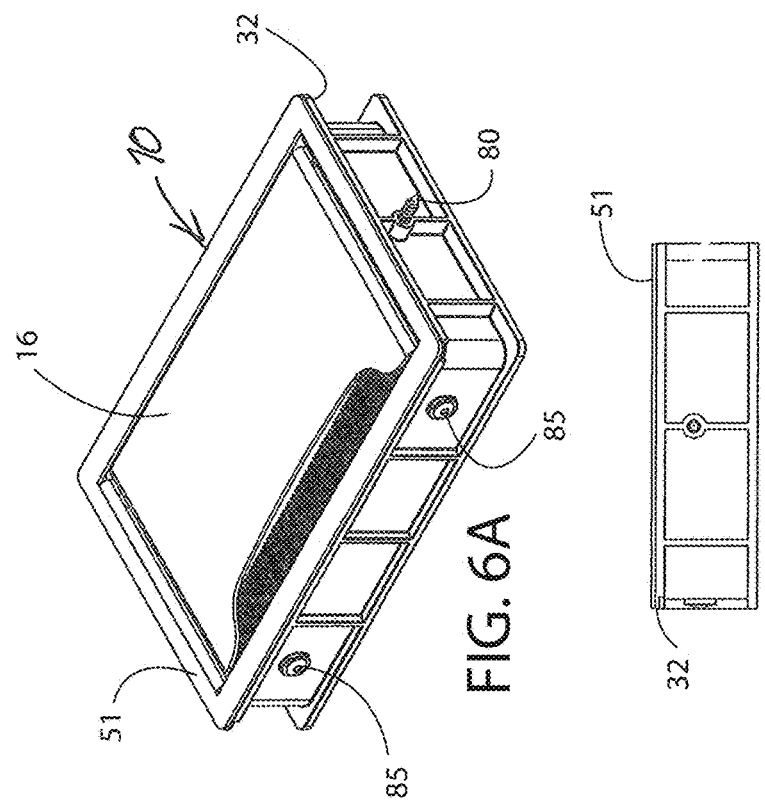
FIG. 6A is a perspective view of the module of FIG. 5 shown with a cover of the module in a closed position.
Figure 6D:
FIG. 6D is a side elevational view of the module of FIG. 5.
Figure 6B:
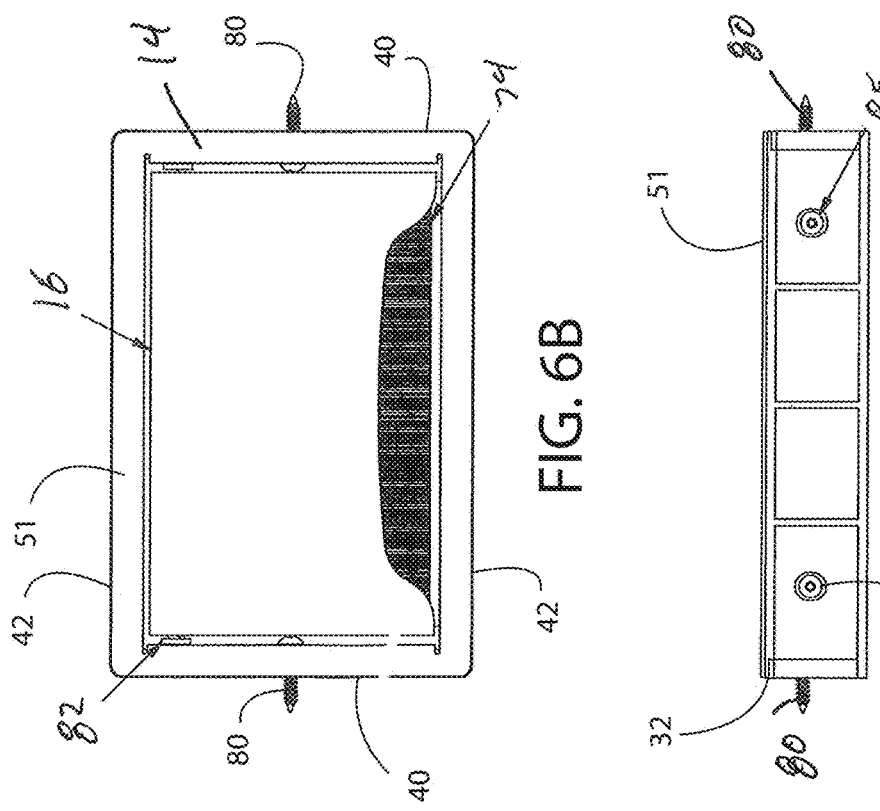
FIG. 6B is a top plan view of the module of FIG. 5.
Figure 6C:
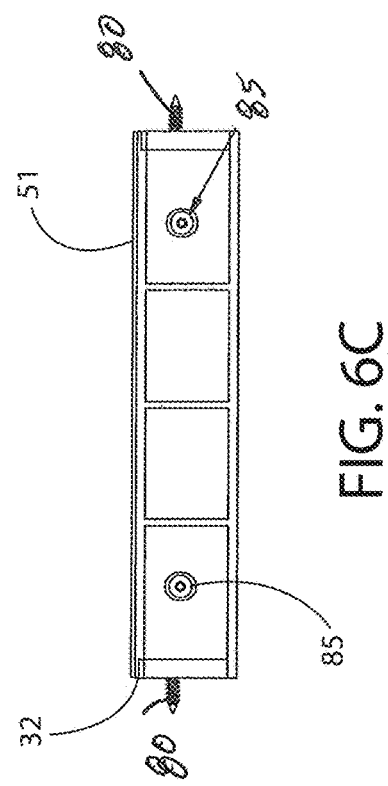
FIG. 6C is a front elevational view of the module of FIG. 5.
Figure 6E:
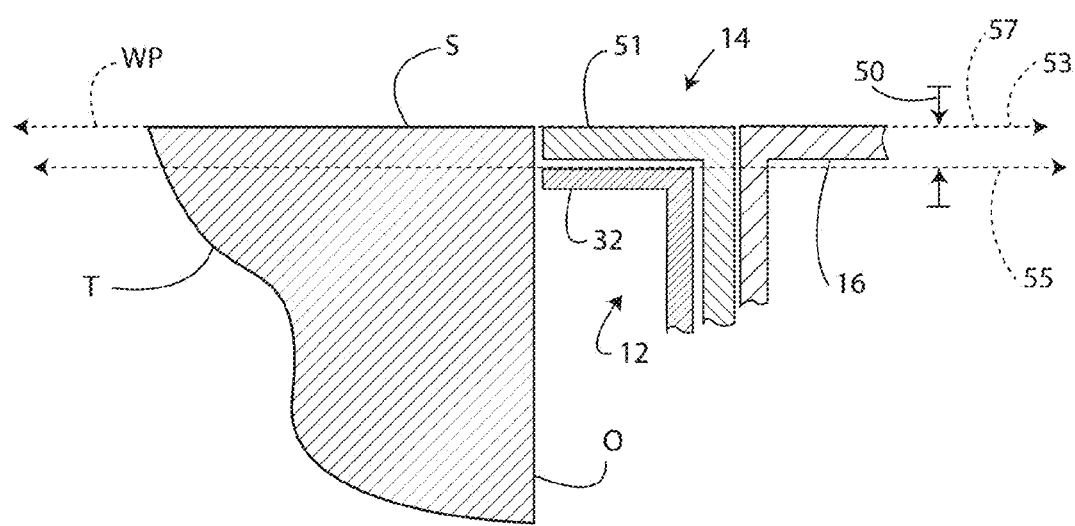
FIG. 6E is a cross sectional view of a portion of the module of FIG. 5, showing a flange of the bezel flush with the surface of the table.

As shown in FIGS. 4A, 4B, and 4C, The access module 10 for providing access to an opening O in a table T includes a grommet 12 located in the opening O and mounted to the table T, a bezel 14 mounted in and supported by the grommet 12, a cover 16 pivotably mounted to the grommet 12 and bezel 14, and a brush assembly 18 mounted to the grommet 12. The grommet 12 and the bezel 14 are located only at or below the surface S of the table T. Moreover, as also shown in FIGS. 4C and 6E, when the cover 16 is in the closed position, no portion of the module 10 is located on a side of the surface S opposite the opening O.

Figure 5:
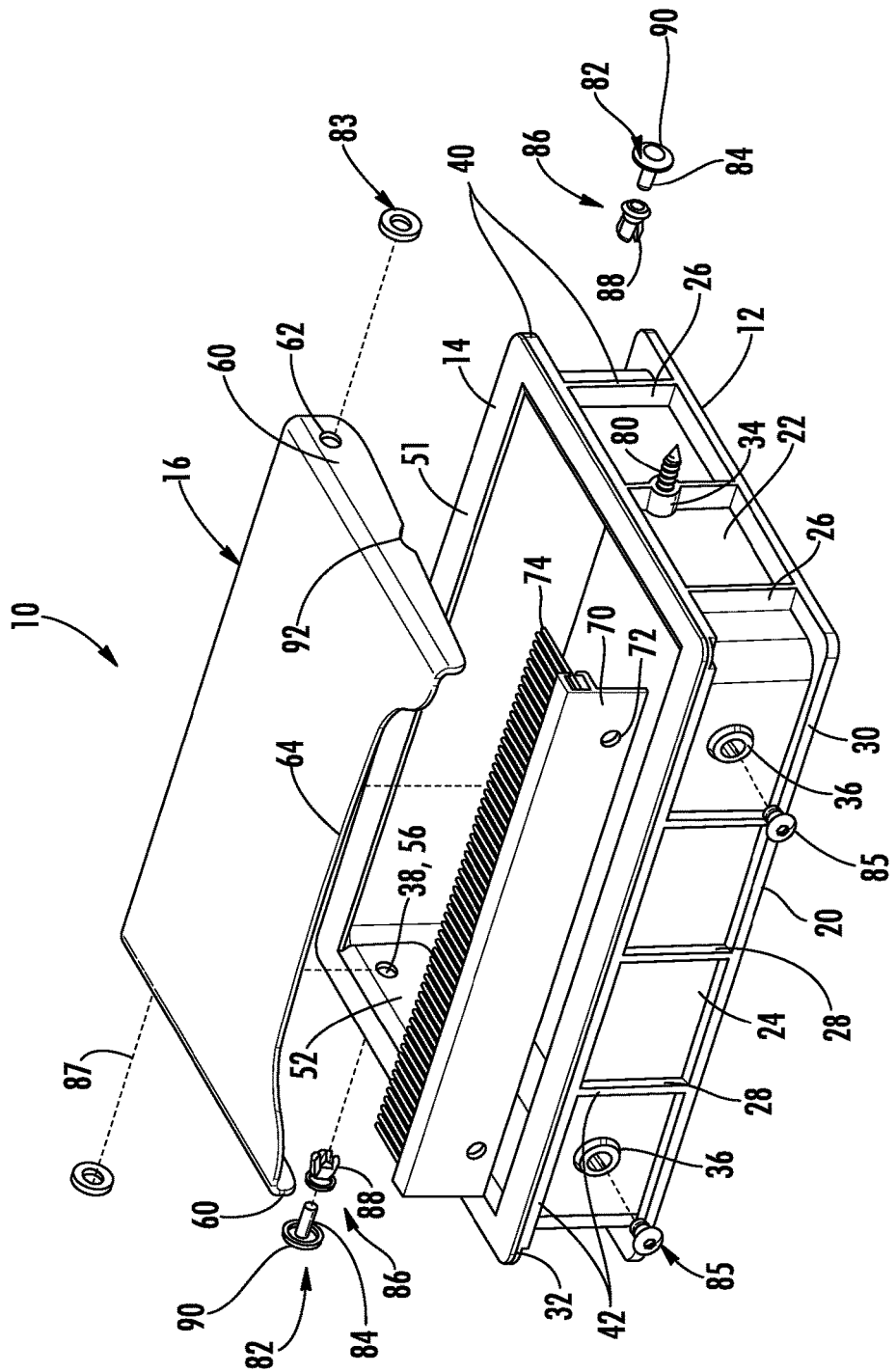
FIG. 5 is an exploded perspective view of the power/data access module according to the present disclosure.

The module 10 and its components are further shown in FIGS. 5-8D. The grommet 12 of FIG. 5 is slightly taller than the grommet 12 of FIG. 4A. With reference to FIGS. 5, 7A, 7B, and 7C, the grommet 12 includes a lightweight body 20 that may be formed from a suitable plastic or resin material. In one aspect, the body 20 is configured to be easily formed in a conventional molding process. The body includes opposite end walls 22 and opposite side walls 24 that form a perimeter shape that conforms to the size and shape of the opening O in the table T into which the module 10 is inserted. The body includes ribs 26 and 28 integral with the respective walls 22, 24, as well as a bottom flange 30 and a top flange 32. The ribs 26, 28 extend from the bottom flange 30 to the top flange 32. The outboard edges of the ribs 26, 28 and flanges 30, 32 are generally contiguous and combine to form side edges 40 (FIGS. 5 and 6B) and end edges 42 (FIGS. 5 and 6B) around the perimeter of the body 20. The edges 40, 42 may be sized for a tight fit within the opening O formed in the table T so that the edges 40, 42 are in contact with the opening O around the entire perimeter of the body 20 and opening O, or at least so that the gap between the edges 40, 42 and the opening O in the table T is very minimal.

The body 20 defines features to permit engagement of the other components of the module 10 to the grommet 12. For instance, as shown in FIG. 7A, the body 20 defines a screw boss 34 in each side wall 22 that defines a bore for receiving a screw, such as screw 80 (FIG. 6C). One side wall 24 defines mounting openings 36 (FIG. 5) that are used for mounting the brush component 18. The side walls 22 further define openings (not shown) or mounting recesses 38 (FIGS. 7A and 7C) for at least partially receiving a pivot assembly 82 (FIG. 5) for pivotably mounting the cover 16 to the bezel 14.

As shown in FIG. 7A, the grommet body 20 includes a central opening 21 defined by the inner surfaces of the end and side walls 22, 24. The opening 21 is sized to snugly fit the bezel 14, shown in detail in FIG. 8A and assembled with the grommet in FIGS. 5, 6A, 6B, 6C, and 6D.

As shown in FIG. 5, the bezel 14 includes a plate or flange 51 that rests on top of the top flange 32 of the grommet 12 when the bezel 14 is assembled with the grommet 12. The bezel 14, like the grommet 12, forms a perimeter shape that conforms to the size and shape of the opening O in the table T into which the module 10 is inserted, such that the periphery of the grommet 12 and the bezel 14 correspond to the periphery of the opening O. As shown in FIG. 6E, the module 10 is mounted to the table T and the top flange 32 is spaced apart from the surface S of the table T so as to define a flange space 50 of the opening O. The flange space 50 extends from the surface S to the top flange 32. In one embodiment, the flange 51 of the bezel 14 is located only in the flange space 50, and the flange 51 is flush with the surface S, as shown in FIG. 6E. The surface S defines a working plane WP of the table T and the flange 51 defines a bezel plane 53. The flange 51 is flush with the surface S when the bezel plane 53 is coplanar with the working plane WP. The flange space 50 is also defined as the portion of the opening O extending from the working plane WP to a flange plane 55 defined by the top flange 32.

With reference to FIG. 8A, the bezel 14 includes opposite side mounting plates 52 extending downward from opposite sides of the flange 51. The side mounting plates 52 are sized and configured to rest against the inside surface of the end walls 22 (FIG. 7A) of the grommet 12 when the module 10 is assembled. The side mounting plates 52 define mounting openings 54 that coincide with the screw bosses 34 of the grommet 12 to receive the screws 80. The side mounting plates 52 further define openings 56 that coincide with the recesses 38 in the end walls 22 of the grommet 12, which in turn coincide with the pivot assembly 82 for the cover 16.

With reference again to FIG. 5, the cover 16, which is mounted to the bezel 14, includes side mounting plates 60 that define openings 62 (only one of the opening 62 is shown in FIG. 5) that coincide with the openings 56 and the recesses 38 when the cover 16 is assembled to the bezel 14 and grommet 12. The openings 56 and the openings 62 are sized to receive a pivot assembly 82 that is pressed through the openings 56 and the openings 62. The mounting plates 60 also each define a cutout 92 (FIG. 5 only one is shown) that is sized to enable passage of the screws 80 into the openings 54 and the mounting bosses 34 when the cover 16 is in the closed position. As shown in FIG. 6E, the cover 16 defines a cover plane 57 that is coplanar with the working plane WP and the flange plane 53 when the cover 16 is in a closed position (FIG. 6A).

The pivot assembly 82 includes a post 84 and an anchor 86 with resilient arms 88 that are splayed outward to hold the pivot assembly 82 in position connecting the cover 16 to the bezel 14 and grommet 12, while permitting pivoting movement of the cover 16 to the open and closed positions about pivot axis 87 (FIG. 5). A washer 83 (FIG. 5) may be interposed between the cover 16 mounting plates 60 and the bezel 14 mounting plates 52 to ensure smooth pivoting movement of the cover 16. A head 90 of the post 84 of the pivot assembly 82 fits within the recess 38 (FIGS. 7A and 7C) in the end walls 22 of the grommet 12 when the cover 16 is mounted to the bezel 14 and the bezel 14 is mounted to the grommet 12. The openings 62 and the openings 56 are coaxial with the pivot axis 87.

The cover 16 defines a cut-out 64 at the free edge of the cover 16 through which wires and cables (not shown) may extend from inside of the module 10. The cut-out 64 is generally concealed by the brush assembly 18.

As shown in FIG. 5, the brush assembly 18 includes a mounting body 70 that defines mounting openings 72 that coincide with the mounting openings 36 formed in the side wall 24. The openings 36 are configured to receive pop rivets 85, or any other suitable fastener, that are pressed through the openings 36 to fasten and mount the mounting body 70 to the grommet 12. A brush 74 is mounted to the mounting body 70 in a conventional manner so that the brush 74 conceals and fills the opening formed at the cut-out 64 in the cover 16 when the cover 16 is in the closed position.

As shown in FIGS. 4C and 6E, the module 10 is configured so that the upper surface of the flange 51 of the bezel 14 sits flush with the surface S of the table T. According to an exemplary method of mounting the module 10 to the table T, the flush mount can be easily achieved by first positioning the table T upside down with the work surface S against a flat surface, such as the floor. Next, the fully assembled module 10 is placed bezel-first through the opening O in the table so that the flange 51 of the bezel 14 rests against the same flat surface or floor. The module 10 is inserted into the opening O with the cover 16 in the closed position. The flange 51 of the bezel 14 is thus ensured to be flush with the surface S of the table. Screws 80 are passed through the openings 54 in the bezel 14 and mounting boss 34 in the grommet 12 and driven into the table T through the sides of the opening O. The module 10 is thus quickly and easily connected to the table T in the flush configuration. In one embodiment, the bezel 14 is only loosely held within the grommet 12 when the module 10 is positioned within the opening O in the table T. In this embodiment, the screws 80 thus fasten the bezel 14 to the grommet 12 and fasten the grommet/bezel assembly to the table T within the opening O.

Thus, according to one feature of the module 10, the grommet 12 permits flush mounting the bezel 14 with the work surface S. In a further aspect, the construction of the module 10 allows the grommet 12 to be formed of a low-cost plastic and permits the bezel 14 to be formed of higher grade materials, such as steel or aluminum. The bezel 14 may be provided with various exterior coatings to match the decor of the table T. The two-piece grommet 12 and bezel 14 construction also means that a common grommet 12 may be used with a wide range of bezels 14 having different outer appearances.

The present disclosure should be considered as illustrative and not restrictive in character. It is understood that only certain embodiments have been presented and that all changes, modifications and further applications that come within the spirit of the disclosure are desired to be protected.

What is claimed is:

1. An access module for providing access to an opening in a table, comprising:
   a grommet mounted to the table within the opening;
   a bezel supported by the grommet and including a flange that is flush with a work surface of the table; and
   a cover pivotably mounted to the bezel,
   wherein no portion of the access module is located on or above the work surface of the table when the cover is in a closed position,
   wherein the grommet defines a bottom flange spaced apart from an upper flange by side walls and end walls of the grommet, and includes;
      a plurality of ribs extending from the end walls and extending from the upper flange to the bottom flange, and
      a plurality of screw bosses formed in the end walls and configured to receive a mounting member for mounting the grommet to the table; and
   wherein the flange of the bezel is supported by the upper flange of the grommet.

2. An access module for providing access to an opening in a table, comprising:
   a grommet mounted to the table within the opening;
   a bezel supported by the grommet and including a flange that is flush with a work surface of the table; and
   a cover pivotably mounted to the bezel,
   wherein:
      no portion of the access module is located on or above the work surface of the table when the cover is in a closed position,
      the grommet defines a bottom flange spaced apart from an upper flange by side walls and end walls of the grommet,
      the flange of the bezel is supported by the upper flange of the grommet
      the upper flange defines a periphery that corresponds to the periphery of the opening, and
      the bottom flange defines a periphery that corresponds to the periphery of the opening.

3. The access module of claim 2,
   wherein said cover defines a cover plane that is coplanar with the working plane when the cover is in a closed position.

4. The access module of claim 3, further comprising:
   a brush assembly mounted to the bezel and including a brush,
   wherein the cover defines a cut-out, and
   wherein the brush is configured to fill the cut-out when the cover is in the closed position.

5. The access module of claim 2, wherein the flange of the bezel defines a periphery that corresponds to a periphery of the opening.

6. An access module for providing access to an opening in a table, comprising:
   a grommet mounted to the table within the opening;
   a bezel supported by the grommet and including a flange that is flush with a work surface of the table; and
   a cover pivotably mounted to the bezel,
   wherein;
      no portion of the access module is located on or above the work surface of the table when the cover is in a closed position,
      the cover is configured to move relative to the bezel and the grommet about a pivot axis;
      the bezel includes (i) a first mounting plate extending from the flange and defining a first pivot opening, and (ii) a second mounting plate extending from the flange and defining a second pivot opening;
      the cover includes (i) an upper surface, (ii) a third mounting plate extending from the upper surface and defining a third pivot opening, and (iii) a fourth mounting plate extending from the upper surface and defining a fourth pivot opening; and
      the first pivot opening, the second pivot opening, the third pivot opening, and the fourth pivot opening are coaxial with the pivot axis.

7. The access module of claim 6, further comprising:
   a first pivot assembly configured to mount the first mounting plate to the third mounting plate by extending through the first pivot opening and the third pivot opening; and a second pivot assembly configured to mount the second mounting plate to the fourth mounting plate by extending through the second pivot opening and the fourth pivot opening.

8. The access module of claim 6, wherein:

the grommet defines a bottom flange spaced apart from an upper flange by side walls, and the first mounting plate, the second mounting plate, the third mounting plate, and the fourth mounting plate are located between the upper flange and the lower flange when the cover is in the closed position.

9. The access module of claim 6, further comprising:

a brush assembly mounted to the bezel and including a brush, wherein the cover defines a cut-out, and wherein the brush is configured to fill the cut-out when the cover is in the closed position.

* * * * *